US012796590B2

(12) United States Patent
Petruzzelli et al.

(10) Patent No.: US 12,796,590 B2
(45) Date of Patent: Nov. 17, 2026

(54) WHEELED GARDEN TOOL

(71) Applicants: Rocco Petruzzelli, Pearl River, NY (US); Gregg B. Feigelson, Chester, NY (US)

(72) Inventors: Rocco Petruzzelli, Pearl River, NY (US); Gregg B. Feigelson, Chester, NY (US)

(*) Notice: Subject to any disclaimer, the term of this patent is extended or adjusted under 35 U.S.C. 154(b) by 217 days.

(21) Appl. No.: 18/887,404

(22) Filed: Sep. 17, 2024

(65) Prior Publication Data

US 2026/0076296 A1 Mar. 19, 2026

(51) Int. Cl.
*A01D 11/06* (2006.01)
*A01D 7/00* (2006.01)
*A01D 7/02* (2006.01)

(52) U.S. Cl.
CPC ................ *A01D 11/06* (2013.01); *A01D 7/00* (2013.01); *A01D 7/02* (2013.01)

(58) Field of Classification Search
CPC ............. A01D 11/06; A01D 7/02; A01D 7/00
See application file for complete search history.

(56) References Cited

U.S. PATENT DOCUMENTS 243,081 A * 6/1881 Preston .................... A01D 7/00 56/400.14
432,168 A * 7/1890 O'Neill .................... A01D 7/00 172/356
1,768,080 A 6/1930 Yasaku
2,033,451 A 3/1936 Rose
2,329,708 A 9/1943 Fetterman
3,952,490 A 4/1976 Brockman
4,009,560 A 3/1977 Wells
4,219,994 A 9/1980 Ciscon
4,516,393 A 5/1985 Lambert
4,821,500 A 4/1989 MacIvergan
5,054,278 A 10/1991 Thorndike
5,235,799 A 8/1993 Quesnelle et al.
5,509,259 A 4/1996 Milbury
6,122,904 A * 9/2000 Garcia de Alba ..... A01D 42/02 56/16.9
D484,373 S * 12/2003 Ross ................................ D8/13
D543,427 S 5/2007 Willison
D599,633 S 9/2009 Renfro
D703,015 S * 4/2014 Sturges ............................ D8/13
11,839,179 B1 12/2023 Bland
2007/0289283 A1 12/2007 Hanas
2012/0111586 A1 5/2012 Kimball
2018/0184582 A1* 7/2018 Orlos ....................... A01D 7/06

* cited by examiner

*Primary Examiner* — Brad Harcourt
(74) *Attorney, Agent, or Firm* — Dunlap Bennett & Ludwig PLLC

(57) ABSTRACT

A wheeled garden raking and thatching tool that can be used with one hand is disclosed. The subject invention uses the weight of the tool with the wheel assembly raised to focus downward pressure onto the rake heads to maximize the utility of the raking action over a large area with minimal applied force while using only one-hand. Additionally, the garden tool of the present invention stands on its own to eliminate the need to bend over to pick up the tool in between use.

6 Claims, 3 Drawing Sheets

WHEELED GARDEN TOOL

BACKGROUND OF THE INVENTION

The present invention relates to garden tools, and, more particularly, to a wheeled garden raking and thatching tool that can be used with one hand.

Raking leaves and light thatching is often physically strenuousness when using conventional rakes and other garden tools. Conventional rakes require two hands to operate effectively, and prolonged use puts significant strain on the shoulders, back and wrists due to the need to repetitively pull, twist and apply downward pressure. This is particularly problematic as the width of the rake increases.

Accordingly, an improved raking and thatching tool is desired.

SUMMARY OF THE INVENTION

In one aspect of the present invention, there is disclosed a wheeled garden raking and thatching tool that can be used with one hand.

In another aspect of the present invention, the gardening tool of the present invention comprises a handle at one end, with the handle connected to one or more raking members, and with a wheel assembly connected to the opposite end of the handle mechanism, such that when the handle is depressed the raking members engage the ground, and when the handle is lifted, the wheel assembly engages the ground.

The subject invention uses the weight of the tool with the wheel assembly raised to focus downward pressure onto the rake heads to maximize the utility of the raking action over a large area with minimal applied force while using only one-hand. Additionally, the invention stands on its own to eliminate the need to bend over to pick up the tool in between use.

These and other features, aspects and advantages of the present invention will become better understood with reference to the following drawings, description and claims.

DETAILED DESCRIPTION OF THE INVENTION

Figure 1:
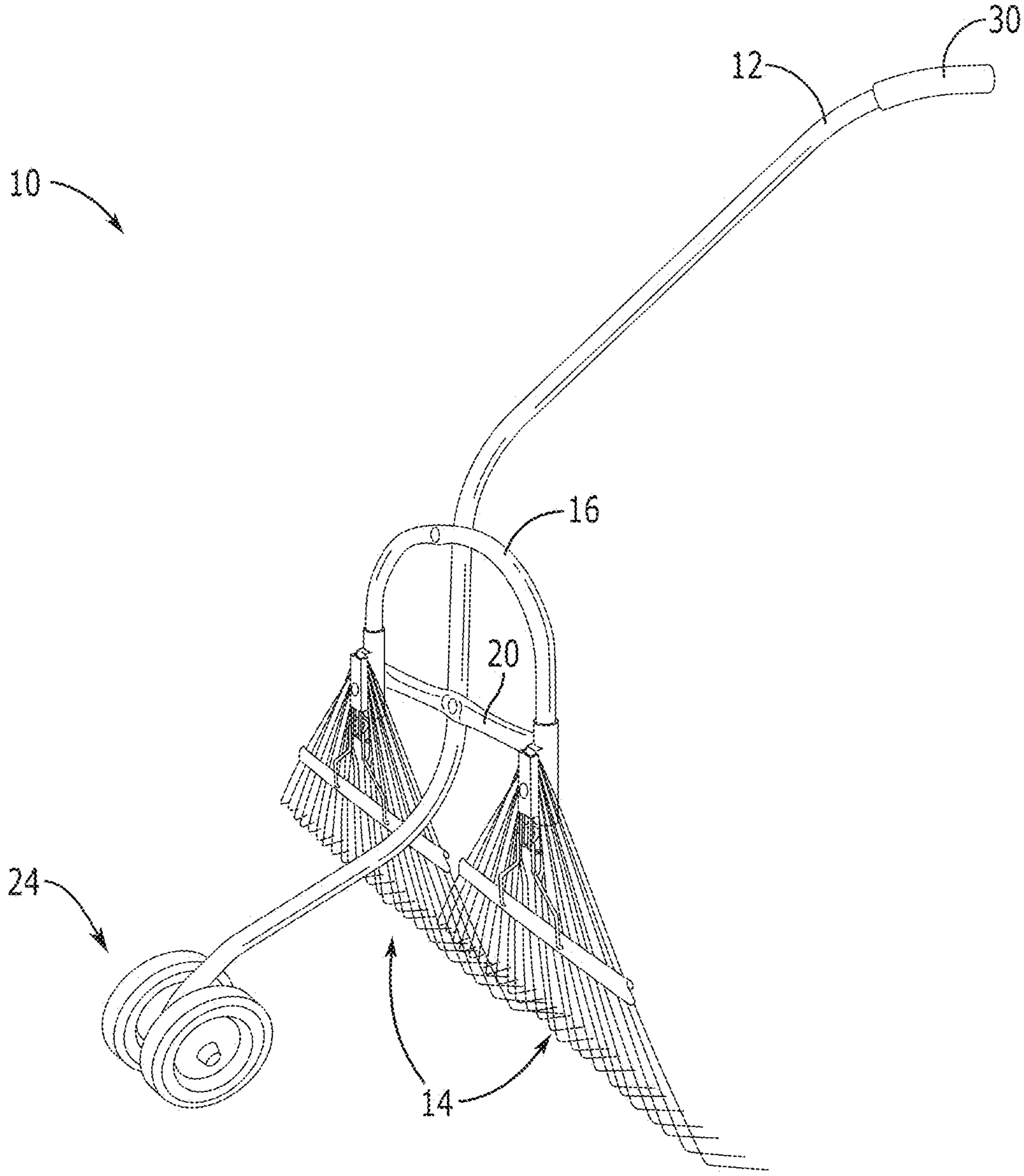
FIG. 1 is a perspective view of wheeled garden tool in accordance with a preferred embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wheeled garden raking and thatching tool that can be used with one hand.

As stated above, the subject invention takes the physical strenuousness out of raking leaves and light thatching compared to conventional rakes, thus providing numerous benefits over conventional devices.

As described herein, and as seen in FIGS. 1-5, the wheeled garden tool 10 of the present invention comprises a pair of steel rake heads 14 mounted on a specially designed, weight-balanced handle 12. Handle 12 comprises a grip portion 30 at one end, and a wheel assembly 24 connected to handle 12 at the opposite end. The rake heads 14 are connected to handle 12 between the grip portion 30 and the wheel assembly 24. The compact design allows the user to rake/thatch a large area with one hand using a tiny fraction of the effort needed to rake/thatch with a standard rake and two hands. In addition, unlike traditional rakes, the gardening tool 10 of the present invention stands on its own between uses.

The claimed invention differs from what currently exists. This invention makes it possible to rake/thatch a wide area while using only one hand—It is orders of magnitude easier to use than a traditional straight rake. In addition, standard rakes require significantly more effort and require more time to achieve the same results as the subject invention.

With the wheels elevated, the subject invention uses the weight of the tool to focus downward pressure onto the rake heads to maximize the utility of the raking action over a large area with minimal applied force while using only one hand. Additionally, the invention stands on its own to eliminate the need to bend over to pick up the tool in between use.

The claimed invention differs from what has previously been published regarding rakes with wheels. 1) Notably, in this invention, the wheels are off the ground when raking. The wheels are only used to maneuver the tool from one work area to another without the need to lift the tool. 2) This invention rakes with the tines in full contact with the ground for maximum and deep raking action with the ability to follow the contours of the terrain—tool designs that have fixed tine depths are less efficient at raking and do not accommodate uneven terrain. 3) This invention rakes via a pulling action (analogous to a traditional rake), which allows for more thorough raking with less effort than the corresponding push type rakes which can be snagged by uneven terrain. To compensate for this resistance, push rakes require a higher tine height which produces less efficient raking. 4) This invention uses the focused weight of the tool applied by the contoured handle and elevated wheels to apply downward pressure on the rake tines to achieve optimal raking action with minimal (one-handed) effort. Other seemingly similar published devices either don't have the ability to supply this downward pressure or require intentionally added weight, or more pressure and effort supplied by the user. Push rakes require the user to supply this pressure/effort while pushing forward. This invention's simplicity of design and effortless use achieves what other, much more-complex published inventions claim to achieve, but by a configuration other inventors failed to conceive.

FIG. 1 depicts a perspective view of a wheeled garden tool constructed in accordance with a preferred embodiment of the present invention. The garden tool 10 comprises a pair of steel rake heads 14 mounted on a specially designed, weight-balanced handle 12. Handle 12 comprises a grip portion 30 at one end, and a wheel assembly 24 connected to handle 12 at the opposite end. The rake heads 14 (and rake head assembly 22) are connected to handle 12 between the grip portion 30 and the wheel assembly 24.

Figure 2:
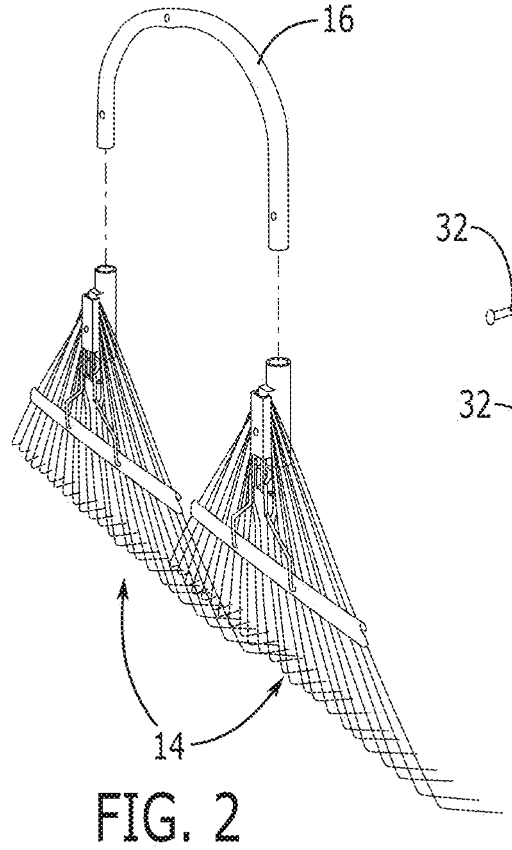
FIG. 2 is a partially exploded perspective view of certain components of the wheeled garden tool of FIG. 1.
Figure 3:
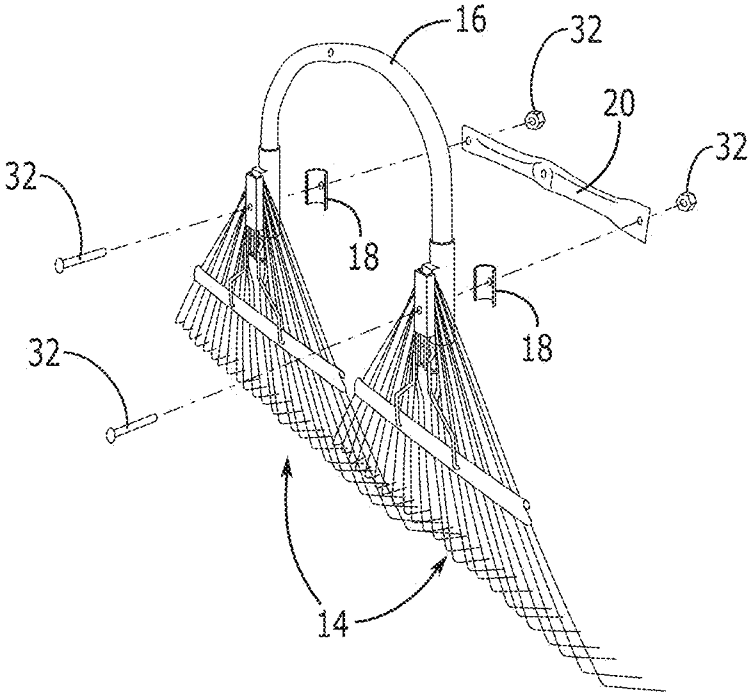
FIG. 3 is a partially exploded perspective view of certain components of the wheeled garden tool of FIG. 1.
Figure 4:
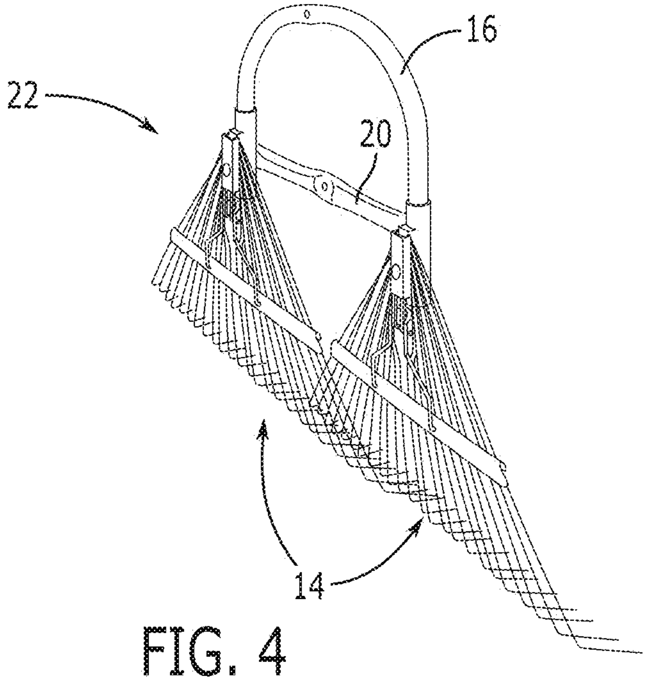
FIG. 4 is a perspective view of the components of FIGS. 2 and 3 assembled into a rake head assembly.

FIGS. 2 and 3 depict partially exploded views of a rake head assembly 22 constructed in accordance with a preferred embodiment of the present invention. Rake head assembly 22 comprises a rake head support beam 16 that is attached to a pair of rake heads 14 via a rake head assembly brace member 20 and associated brackets 18. FIG. 4 depicts a fully assembled rake head assembly 22 in accordance with a preferred embodiment of the present invention.

Figure 5:
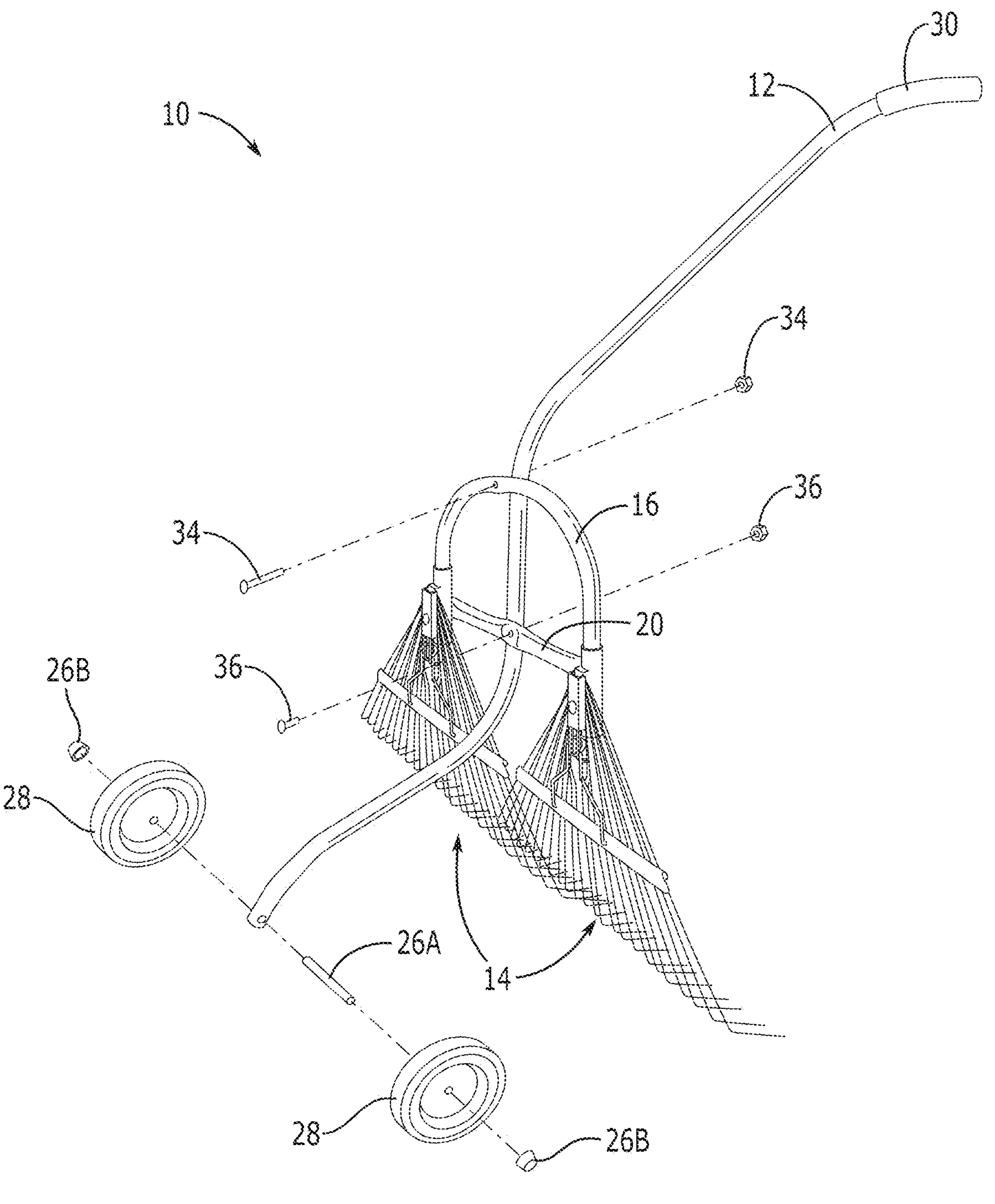
FIG. 5 is a partially exploded perspective view of the invention of FIG. 1.

FIG. 5 depicts an exploded view of the wheel assembly 24 in accordance with a preferred embodiment of the present invention. As seen therein, in a preferred embodiment wheel assembly 24 comprises a pair of wheels 28 that are connected to handle 12 via an axle 26A and axle caps 26B. Other means of attaching wheel assembly 24 to handle 12 are contemplated as a matter of application specific design choice. In addition, while two wheels 28 are depicted, a single wheel or more than two wheels could be used without departing from the spirit of the invention.

Once the Items are assembled as described and shown, the unit functions in one of three basic positions: (1) rakes down and wheels down, (2) rakes down and wheels up, or (3) rakes up and wheels down. To start, the tool 10 is placed on the ground with wheels and rakes down (its resting position). The grip portion 30 at one end of the handle 12 is taken by one hand of the user and then lowered to the point of elevating the wheel assembly 24. The rake assembly 22 is now in its raking position wherein leaves or other debris can be gathered by pulling forward toward the user.

At the end of the pulling stroke, the handle 12 is then lifted to the wheels-down/rake down position and pushed away from the user; this motion is facilitated by the wheel assembly 24. This serves to clear the rake tines 14 and prepare for a repeat of the forward raking action. The two motions are cycled as often as needed to complete the raking in the area. To move the tool 10, the handle 12 can be lifted to the point that the tool 10 is only resting on the wheels 28 so it can easily be navigated to rake or thatch a different area.

In a preferred embodiment the invention comprises three primary components: a handle 12, a rake head assembly 22, and a wheel assembly 24.

In a preferred embodiment the handle 12 comprises of a length of round steel tubing (finished length of approximately 1702 mm) with 4 bends all within the same plane. One end of the handle 12 has a hand grip 30 and the other end of handle 12 has a hole perpendicular to the plane of the bends for the wheel axle 26A. The sequence of bends starting from the hand grip end 30 are (bend start/finish measurements are based on measurement of the finished handle, bend direction is relative to Bend 1 on the hand grip end): Bend 1: R=~228 mm, start ~68 mm, end ~200 mm, Bend 2 (same): R=~157 mm, start ~914 mm, end ~1029 mm, Bend 3 (opposite): R=~164 mm, start ~1175 mm, end ~1314 mm, Bend 4 (same): R=~246 mm, start ~1461 mm, end ~1619 mm. The handle has three holes through the tube located as follows: One hole is along the center line of the tube in the same plane as the bends at ~1041 mm from the hand grip end. The 2nd hole is similarly disposed but ~1156 mm from the same end. The third hole (for the axle) is ~10 mm from the wheel bearing end along the center line of the tube perpendicular to the plane of the bends.

In a preferred embodiment, the rake head assembly 22 comprises the following primary components: U-shaped rake head support beam 16, brace 20, two steel rake heads 14 and two nuts and bolts 32. In a preferred embodiment, the support beam 16 is made of steel tube and has two R=157 mm bends in the same plane that form a U-shape that is ~394 mm long (outer edge to outer edge). The support beam has 3 holes perpendicular to the plane of the bends and along the center line of the tube; one set of holes is ~48 mm from each end of the tube and one in the center. The brace 20 is ~400 mm long and made of steel tube. This piece is straight with ~29 mm of each end flattened in the same plane. The brace has three holes perpendicular to the plane of the flattened sections; one set of holes is ~13 mm from each end and one hole is in the center. In a preferred embodiment, the rake heads 14 are standard 24 tine steel rake heads with associated hardware.

In a preferred embodiment, the wheel assembly 24 comprises a steel or similar solid rod axle 26A, two D=~145 mm plastic/rubber wheels 28 and cotter pins or axle caps 26B.

The ends of the U-shaped rake head support beam 16 are inserted into the top of each rake head 14 (see FIGS. 2 and 3) such that the bent end of the tines of each rake head are facing the same direction and the holes in each rake head align with the holes in the support beam 16. A bolt 32 is inserted through the hole in the front of each rake head 14, through the hole in the support beam 16, through the rear support hardware of the rake head, and then through the holes on each respective end of the brace 20. The two bolts are secured with nuts 32.

A bolt 36 is inserted into the center holes in both the rake head support beam 16 and the brace 20, and a bolt 34 is inserted into the corresponding hole in support beam 16 and handle 20 to secure the rake head assembly 22 to handle 12, such that the bolt heads are on the same side as the front side of the rake heads. From the backside of rake head assembly, the axle-bearing end of the handle is inserted below the brace and between the rake heads so that the two holes in handle can receive the two bolts (34 and 36) inserted into support beam and the brace. The bend on the axle end of the handle should curve downward. The assembly is fastened with two nuts (34 and 36). The axle rod 26A is inserted into the hole in the end of handle 12 and a wheel 28 is mounted on each side of the axle and secured with caps or cotter pins 26B.

The material for the handle is ideally round tubular steel but other materials and shapes of tube could be used. Some variation in the OD of the tubing is also an option. Also, the width (wider or narrower) and material of the rake head are subject to potential variation. The wheels could also vary in size and material of construction. One variation includes segmenting the main handle into multiple pieces that snap together via swage fittings.

Other variations include 1) a modified rake head support beam and bracket capable of accommodating as many as three rake heads or 2) a variation that contains a single large rake head.

It should be understood, of course, that the foregoing relates to exemplary embodiments of the invention and that modifications may be made without departing from the spirit and scope of the invention as set forth in the following claims.

What is claimed is:

1. A wheeled garden raking tool for one-handed operation comprising:

a weight-balanced handle comprising a grip portion at a first end, a wheel assembly at an opposite second end, and a rake head assembly positioned between the grip portion and the wheel assembly;

the rake head assembly comprising a first rake head comprising multiple rake tines connected to a first end of a U-shaped support beam, and a second rake head comprising multiple rake tines connected to a second end of the U-shaped support beam, the rake head assembly being rigidly connected to the handle; and the wheel assembly comprising at least one wheel connected to the second end of the handle;

wherein the handle is configured such that lowering the grip portion with a single hand elevates the wheel assembly off the ground and focuses a weight of the tool onto the rake tines to engage the ground for raking, and raising the grip portion lowers the wheel assembly into engagement with the ground to support the tool for transport.

2. The raking tool of claim 1, wherein the rake head assembly and the wheel assembly are connected to the handle in a manner such that the raking tool can be positioned such that (1) one end of the rake head tines and the at least one wheel each touch the ground at the same time, (2) the rake head tines touch the ground and the wheel does not, or (3) the rake head tines do not touch the ground and the wheel does touch the ground.

3. The raking tool of claim 1, wherein the handle comprises of a length of round steel tubing with four bends all within the same plane.

4. The raking tool of claim 1, wherein the rake head assembly further comprises a brace connecting the first rake head and the second rake head, and wherein the first rake head, the second rake head, and the U-shaped support beam are steel.

5. The raking tool of claim 1, wherein the wheel assembly comprises a solid rod axle and two wheels.

6. The raking tool of claim 1, wherein each of the first rake head and the second rake head is attached to the top of the U-shaped support beam such that the bent end of the tines of each rake head are facing in the direction of the grip portion of the handle.

* * * * *